United States Patent
Li et al.

(10) Patent No.: US 6,442,490 B1
(45) Date of Patent: Aug. 27, 2002

(54) VERTICAL CABLE TIME PROCESSING

(75) Inventors: Jianchao Li; Long Don Pham, both of Houston, TX (US)

(73) Assignee: PGS Americas, Inc., Houston, TX (US)

( * ) Notice: Subject to any disclaimer, the term of this patent is extended or adjusted under 35 U.S.C. 154(b) by 145 days.

(21) Appl. No.: 09/607,272

(22) Filed: Jun. 30, 2000

(51) Int. Cl.$^7$ .............................................. G06F 19/00
(52) U.S. Cl. ........................................... 702/18; 703/10
(58) Field of Search ..................... 702/18, 14; 703/8, 703/6, 10; 367/57, 38, 40, 52, 73; 181/111

(56) References Cited

U.S. PATENT DOCUMENTS

| | | | |
|---|---|---|---|
| 4,611,311 A | 9/1986 | Frasier | 367/38 |
| 4,613,960 A | 9/1986 | Hinkley et al. | 367/51 |
| 4,627,036 A | 12/1986 | Wyatt | 367/57 |
| 4,635,238 A | 1/1987 | Gallagher et al. | 367/40 |
| 4,802,146 A | 1/1989 | Moeckel | 367/52 |
| 4,802,147 A | 1/1989 | Moeckel | 367/57 |
| 4,847,813 A | 7/1989 | Alam et al. | 367/57 |
| 4,893,694 A | 1/1990 | Houck et al. | 181/111 |
| 4,894,807 A | 1/1990 | Alam et al. | 367/15 |
| 4,894,809 A | 1/1990 | Moeckel | 367/57 |
| 4,926,393 A | 5/1990 | McClellan et al. | 367/57 |
| 4,955,952 A | 9/1990 | Williams et al. | 181/111 |
| 5,051,960 A | 9/1991 | Levin | 367/24 |
| 5,111,437 A | 5/1992 | Rice | 367/57 |
| 5,136,550 A | 8/1992 | Chambers | 367/38 |
| 5,170,377 A | 12/1992 | Manzur et al. | 367/73 |
| 5,402,392 A | * 3/1995 | Lu et al. | 367/75 |
| 5,481,501 A | 1/1996 | Blakeslee et al. | 367/57 |
| 5,521,881 A | * 5/1996 | Lau et al. | 367/24 |
| 5,901,113 A | 5/1999 | Masak et al. | 367/57 |
| 5,978,314 A | * 11/1999 | Pham | 367/52 |
| 6,112,155 A | * 8/2000 | Pham | 702/14 |

FOREIGN PATENT DOCUMENTS

| | | | | |
|---|---|---|---|---|
| WO | WO 99/54758 | * | 1/1999 | G01V/1/28 |

OTHER PUBLICATIONS

Frasier, C., "Analysis of Conventional and Converted Mode Reflections at Putah Sink, California using Three–Component Data", Geophysics, vol. 55, No. 6 (Jun. 1990); pp. 646–659.

* cited by examiner

Primary Examiner—Edward Lefkowitz
Assistant Examiner—Victor J. Taylor

(57) ABSTRACT

A method for processing three-dimensional seismic data is provided. The seismic data is at least partially the result of receiving a seismic wave with a seismic receiver. At least a portion of the seismic wave is generated by a seismic source. The source and receiver are both horizontally offset and vertically offset. The method comprises binning at least a portion of the seismic data in common reflection point bins. The method comprises sorting the seismic data within the bin to create common reflection point gathers. The method further comprises analyzing velocity, and applying surface consistent statics corrections to at least a portion of the seismic data within said common reflection point gathers. The method also comprises applying a non-hyperbolic normal moveout equation to at least a portion of said seismic data, and stacking at least a portion of said seismic data within said common reflection point gathers.

51 Claims, 8 Drawing Sheets

US 6,442,490 B1

VERTICAL CABLE TIME PROCESSING

BACKGROUND OF THE INVENTION

Historically, seismic surveys utilized a source and a receiver on the surface of the earth. In these cases, the source and the receiver were considered to have only a horizontal offset. This made the geometry associated with processing the seismic data relatively simple. Seismic prospecting has evolved. Currently, many seismic prospecting methods use sources and receivers with both a horizontal and vertical offset. Examples of this are seismic profile data, vertical cable data, ocean bottom cable data and streamer data. This vertical offset causes the reflection of the raypath to be somewhere between the midpoint of the horizontal offset and the receiver—even for flat reflectors. Furthermore, the raypath is not symmetric about the reflection point.

For years seismic signal processing has concentrated on placing various traces in bins based on a common depth point (CDP) or common midpoint (CMP) for each trace. However, as stated above, with vertical offset data the reflection point is between the midpoint of the horizontal offset and the receiver. In order to continue to use CDP or CMP binning, the source and the receiver are vertically shifted to a flat datum to replicate the historic source and receiver positions. This is called a static shift. Then various traces are placed in bins based on a common depth point (CDP) or common midpoint (CMP) for each trace. This has inherent problems. By shifting the source and receiver the true reflector moves. This causes significant errors and the stacking image is smeared.

The current simple static vertical shift is inaccurate. Furthermore, common depth point (CDP) and common mid-point (CMP) binning does not produce quality results when utilized in situations with a vertical offset. There is a long felt need for a method which is more accurate than current techniques, but is equivalent in both expense and speed.

SUMMARY OF THE INVENTION

A method for processing three-dimensional seismic data is provided. The seismic data is at least partially the result of receiving a seismic wave with a seismic receiver. At least a portion of the seismic wave is generated by a seismic source. The source and receiver are both horizontally offset and vertically offset. The method comprises binning at least a portion of the seismic data in common reflection point bins. The method comprises sorting the seismic data within the bin to create common reflection point gathers. The method further comprises analyzing velocity, and applying surface consistent statics corrections to at least a portion of the seismic data within said common reflection point gathers. The method also comprises applying a non-hyperbolic normal moveout equation to at least a portion of said seismic data, and stacking at least a portion of said seismic data within said common reflection point gathers.

A system for processing three-dimensional seismic data is also provided. The system comprises means for binning at least a portion of the seismic data in common reflection point bins. The system further comprises means for sorting the seismic data within the bin to create common reflection point gathers. The system further comprises means for analyzing velocity and means for applying surface consistent statics corrections to at least a portion of the seismic data within said common reflection point gathers. The system also comprises means for applying a non-hyperbolic normal moveout equation to at least a portion of said seismic data, and means for stacking at least a portion of said seismic data within said common reflection point gathers.

An apparatus for processing three-dimensional seismic data is provided. The apparatus comprises a common reflection point binner, and a sorter. The apparatus further comprises a velocity analyzer. The apparatus further comprises a surface consistent statics corrector. The apparatus also comprises a non-hyperbolic normal moveout applicator, and a stacker.

DETAILED DESCRIPTION OF EXAMPLE EMBODIMENTS OF THE PRESENT INVENTION

Figure 1:
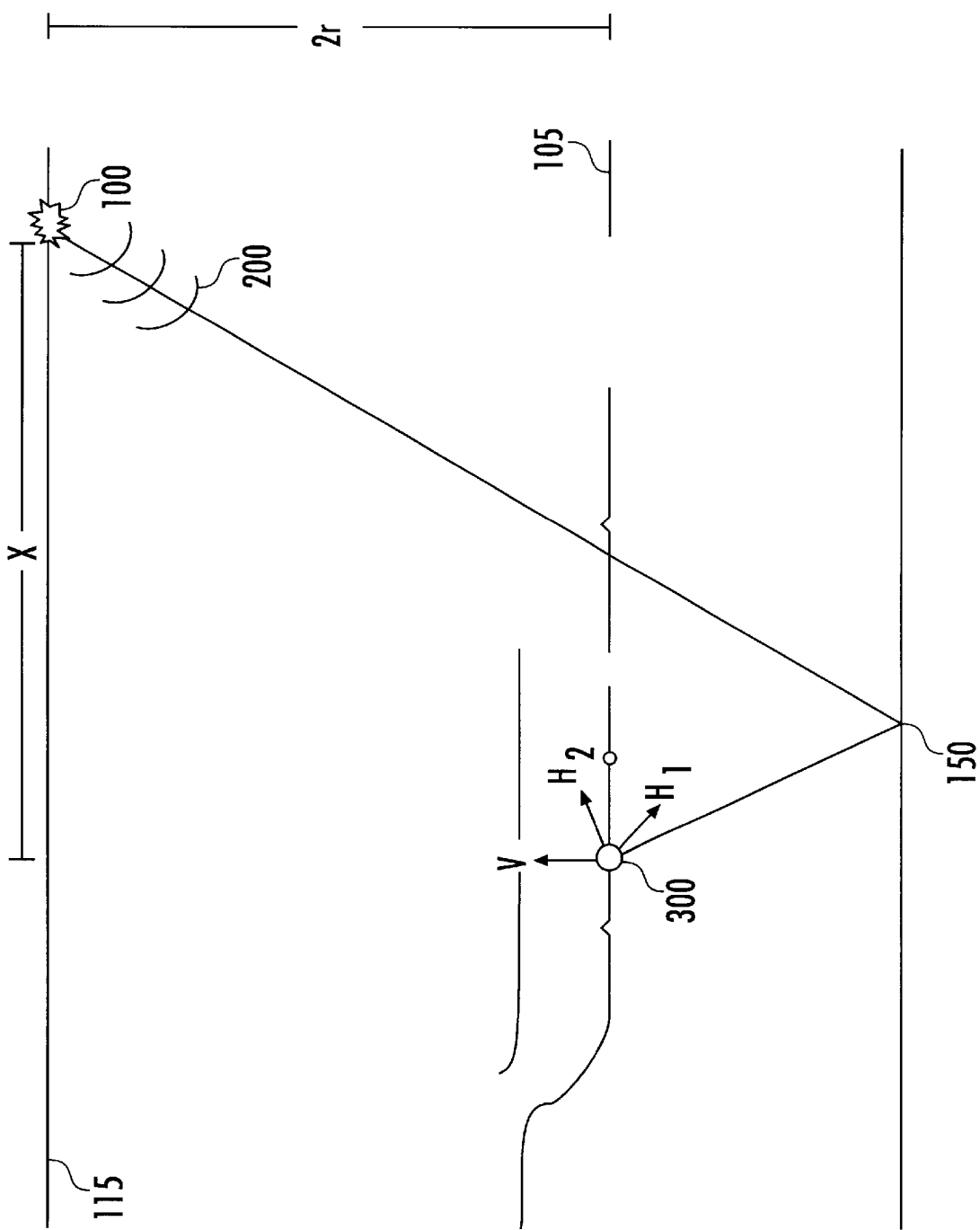
FIG. 1 is a diagram of the acquisition geometry associated with one marine embodiment of the present invention.
Figure 2:
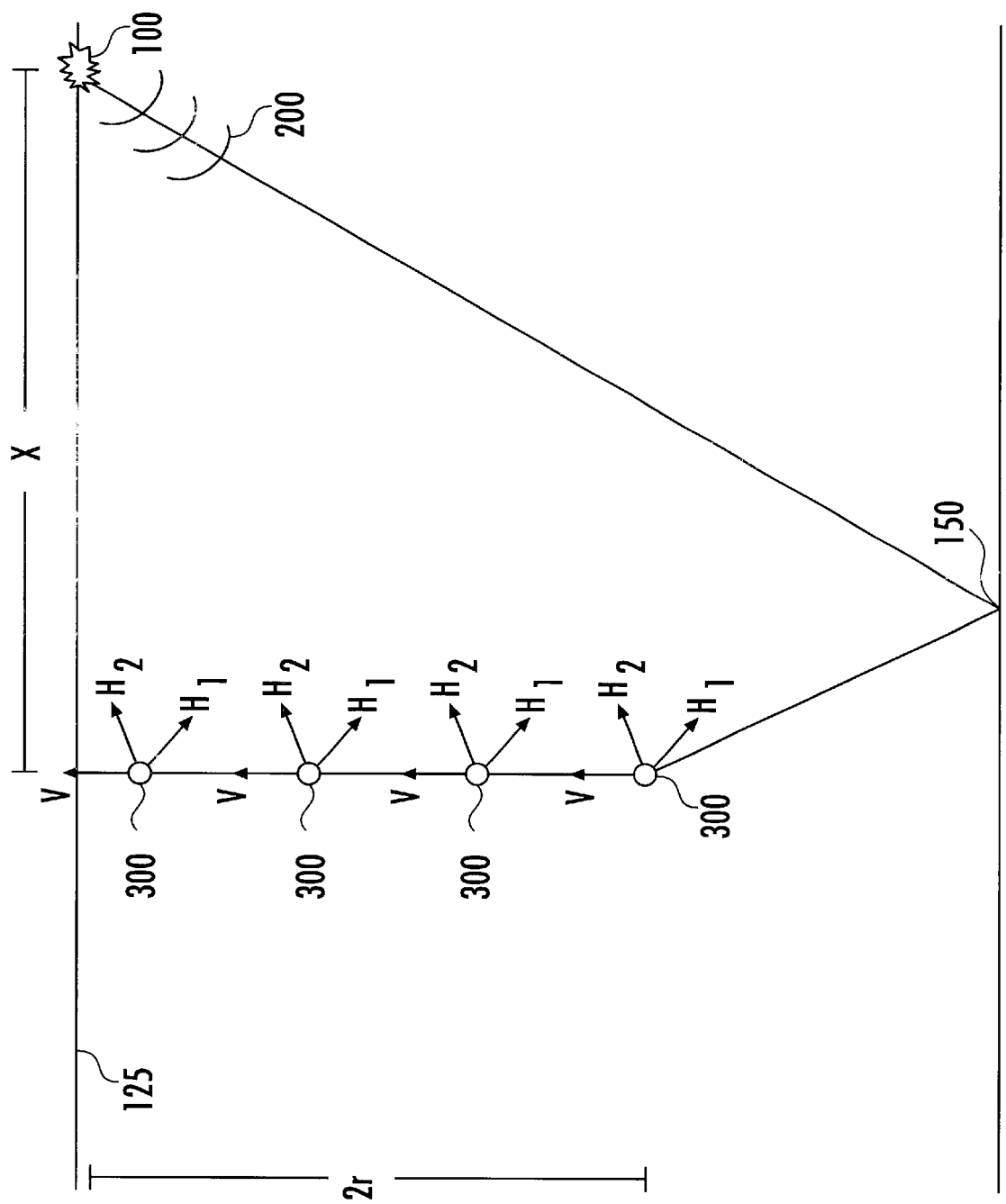
FIG. 2 is a diagram of the acquisition geometry associated with one land embodiment of the present invention.

In one embodiment of the present invention, a method of processing three-dimensional seismic data is provided. FIGS. 1 and 2 illustrate the geometry of the method in both the vertical cable and marine environment. As will occur to those of ordinary skill in the art, the seismic data is at least partially the result of receiving a seismic wave (200) with a seismic receiver (300). Typical receivers (300) are geophones, hydrophones, accelerometers, or any other seismic receiver (300) that will occur to those of ordinary skill. At least a portion of the seismic wave (200) is generated by a seismic source (100). Typical sources (100) are airguns, dynamite, vibrators, or any other source that will occur to those of ordinary skill in the art. As shown in FIG. 1, in the marine environment, at least one receiver (300) is on the ocean bottom (105) or located on a streamer (not shown) above the ocean bottom (105). The source (100) is located at or near the surface of the water (115). As shown in FIG. 2, in vertical cable situations, at least one receiver (300) is vertically suspended. The source (100) is on or near the surface of the earth (125). In both situations, the source (100) and receiver (300) are horizontally offset (X) and vertically offset ($Z_r$).

Figure 3:
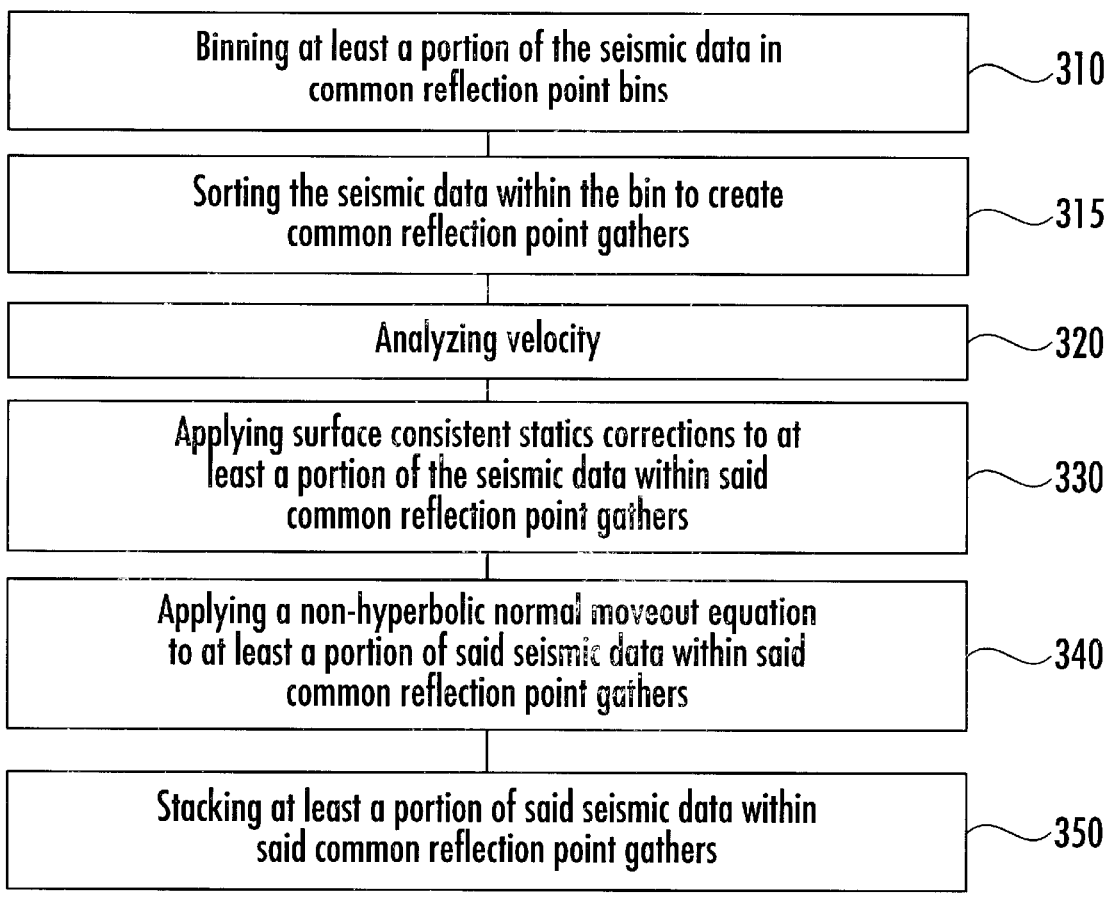
FIG. 3 is a flow diagram of one embodiment of the method of the invention.

Comparing now FIG. 3 with FIGS. 1 and 2, in one embodiment, the method comprises binning (310) at least a portion of the seismic data in common reflection point (150)

bins. The method further comprises sorting (315) the seismic data within the bin to create common reflection point gathers. As will occur to those of ordinary skill, in typical seismic acquisition many traces are developed from many sources (100) and many receivers (300). As such, many source-receiver pairs will generate traces (200) from many different reflection points. However, various source-receiver pairs will have different reflection points (150). Thus, by binning (310) and sorting (315) these traces in common reflection point (150) gathers, all the traces undergoing the method will have a common reflection point (150). This is clearly a subset of the total acquired data. Some example methods of binning (310) and sorting (315) are discussed below.

The method further comprises analyzing velocity (320). Various methods of analyzing velocity (320) will occur to those of ordinary skill and a few example methods are discussed below.

The method further comprises applying (330) surface consistent statics corrections to at least a portion of the seismic data within the common reflection point (150) gathers. Again, various methods of applying (330) surface consistent statics corrections exist and examples of these are also discussed below.

The method further comprises applying (340) a non-hyperbolic normal moveout equation to at least a portion of the seismic data. The method also comprises stacking (340) at least a portion of the seismic data within the common reflection point (150) gathers.

In a further embodiment, the binning (350) further comprises determining the common reflection point (150) of a trace. In an even further embodiment, the method further comprises determining the common reflection point (150) independent of velocity. Those of ordinary skill in the art will recognize that this velocity independence holds for both P-P waves and S-S waves and is shown in the equations that follow. P-P waves are compressional waves before and after contact with the reflector. S-S waves are shear waves before and after contact with the reflector.

Figure 4:
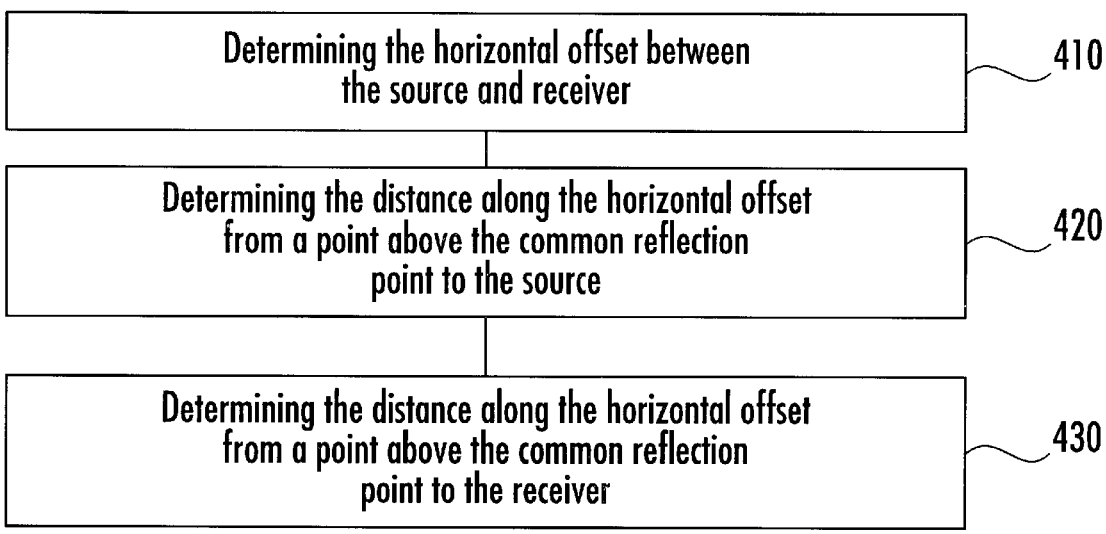
FIG. 4 is a flow diagram of another aspect of further embodiment of the method of the invention.
Figure 5:
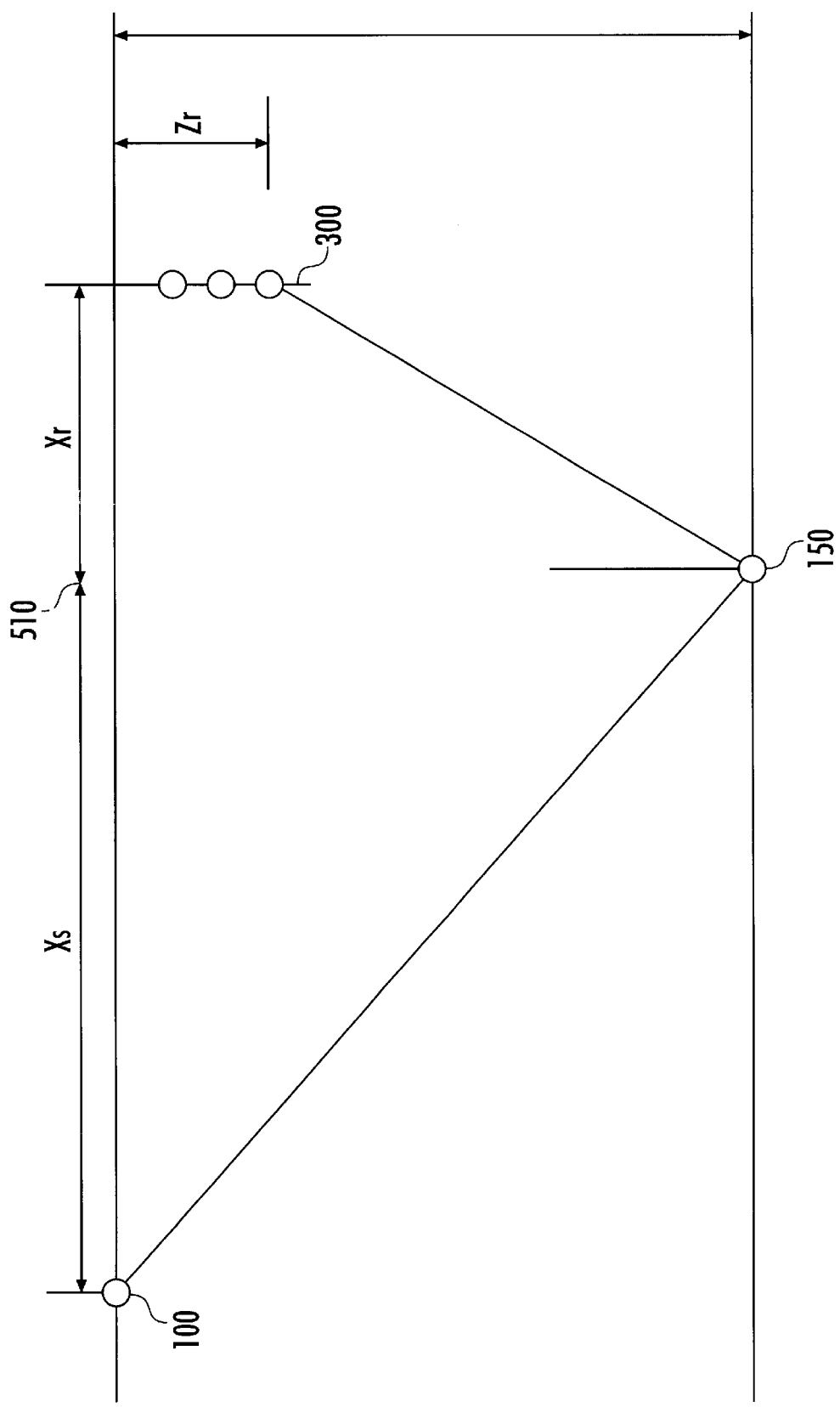
FIG. 5 is a diagram of the geometry associated with one aspect of the present invention.

Turning now to FIG. 4 and FIG. 5, in an even further embodiment, the determining the common reflection point (150) further comprises determining (410) the horizontal offset (X) between the source (100) and receiver (300). The method further comprises determining (420) the distance ($X_s$) along the horizontal offset (X) from a point (510)(710) above the common reflection point (150) to the source (100). The method further comprises determining (430) the distance ($X_r$) along the horizontal offset (X) from a point (510)(710) above the common reflection point (150) to the receiver (200). Various methods of determining (410)(420)(430) the geometry associated with the common reflection point (150) will occur to those of ordinary skill in the art. In various alternate embodiments these geometrical relationships are known a priori, or determined by reading the trace header, measuring the distances, calculating the distances, measuring the time, or any other method that will occur to those of ordinary skill.

As illustrated in FIG. 5, in an even further embodiment, the geometry of the method corresponds to the following equations:

$$X=X_s+X_r$$

$$X_s = \frac{Z}{2Z-Z_r}X$$

$$X_r = \frac{Z-Z_r}{2Z-Z_r}X$$

X comprises the horizontal offset between the source (100) and receiver (300).

$X_s$ comprises the distance along the horizontal offset (X) from a point above the common reflection point (510) to the source (100).

$X_r$ comprises the distance along the horizontal offset (X) from a point above the common reflection point (510) to the receiver (200).

$Z_r$ comprises the depth of the receiver (200).

Z comprises the depth of the common reflection point (150).

In various alternate embodiments these geometrical relationships are known a priori, or determined by reading the trace header, measuring the distances, calculating the distances, measuring the time, or any other method that will occur to those of ordinary skill.

Furthermore, in another embodiment, the geometry of FIG. 5 is also expressed in terms of travel time:

$$X=X_s+X_r$$

$$X_s = \frac{1}{2}\frac{t_0}{t_0-t_r}X$$

$$X_r = \frac{1}{2}\frac{t_0-2t_r}{t_0-t_r}X$$

$$t_0=2Z/V$$

$$t_r=Z_r/V$$

$t_0$ comprises the two way travel time from a point (510) above the common reflection point (150) to the common reflection point (150).

$t_r$ comprises receiver depth in time.

X comprises the horizontal offset between the source (100) and receiver (300).

$X_s$ comprises the distance along the horizontal offset from a point (510) above the common reflection point (150) to the source (100).

$X_r$ comprises the distance along the horizontal offset from a point above the common reflection point (150) to the receiver (300).

$Z_r$ comprises the depth of the receiver (300).

Z comprises the depth of the common reflection point (150).

In various alternate embodiments these geometrical relationships are known a priori, or determined by reading the trace header, measuring the distances, calculating the distances, measuring the time, or any other method that will occur to those of ordinary skill.

Figure 6:
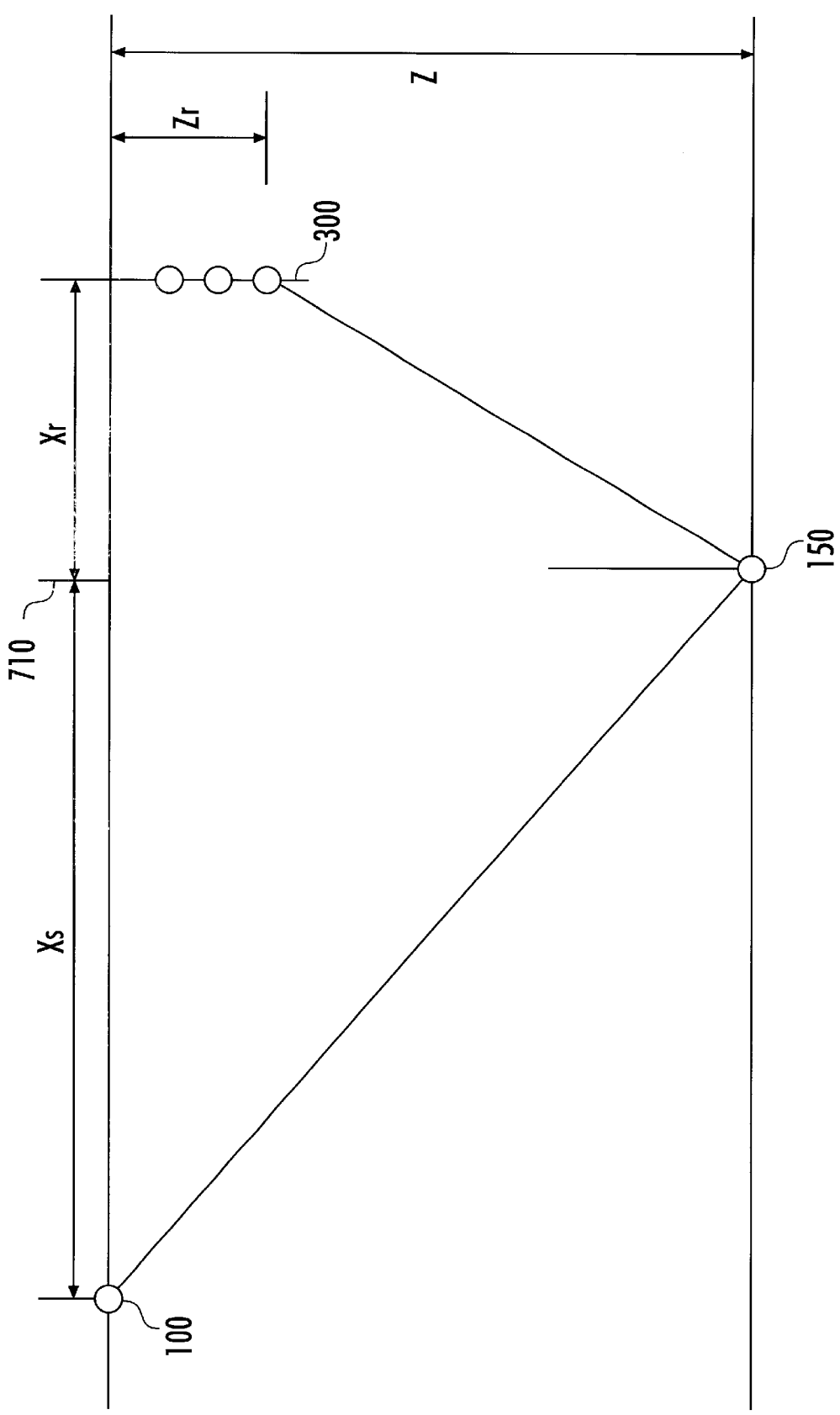
FIG. 6 is a diagram of the geometry associated with another aspect of the present invention.

In an even further embodiment, the binning further comprises common reflection point (150) binning (310) for P-S waves. P-S waves are often called converted waves because the compressional wave converts to a shear wave upon contact with a reflector. As illustrated in FIG. 6, the geometry of the method corresponds to the following equations:

$$X_s = \frac{\sqrt{1+(X_s/Z)^2(1-G^2)}}{(1-Z_r/Z)G + \sqrt{1+(X_s/Z)^2(1-G^2)}} X$$

$X_r = X - X_s$ $X = X_s + X_r$ $G = V_s/V_p = 1/\gamma$

X comprises the horizontal offset between the source (100) and receiver (300).

$X_s$ comprises the distance along the horizontal offset (X) from a point (710) above the common reflection point (150) to the source (100).

$X_r$ comprises the distance along the horizontal offset (X) from a point (710) above the common reflection point (150) to the receiver (300).

$Z_r$ comprises the depth of the receiver (300).

Z comprises the depth of the common reflection point (150).

$V_s$ comprises the S-wave velocity of the medium.

$V_p$ comprises the P-wave velocity of the medium.

G comprises the ratio of the S-wave velocity and the P-wave velocity.

In various alternate embodiments these geometrical relationships are known a priori, or determined by reading the trace header, measuring the distances, calculating the distances, measuring the time, or any other method that will occur to those of ordinary skill.

In a further embodiment, the geometry of FIG. 6 is also expressed in terms of travel time:

$X = X_s + X_r$ $$X_s = \frac{\sqrt{1+\left(\frac{1+G}{GV_p t_{0ps}} X_s\right)^2 (1-G^2)}}{(1-t_r/t_{0ps})G + \sqrt{1+\left(\frac{1+G}{GV_p t_{0ps}} X_s\right)^2 (1-G^2)}} X$$

$X_r = X - X_s$ $G = V_s/V_p = 1/\gamma$ $$t_{0ps} = \frac{1+\gamma}{V_p} Z$$

$$t_r = \frac{1+\gamma}{V_p} Z_r$$

X comprises the horizontal offset between the source (100) and receiver (300).

$X_s$ comprises the distance along the horizontal offset from a point (710) above the common reflection point (150) to the source (100).

$X_r$ comprises the distance along the horizontal offset from a point (710) above the common reflection point (150) to the receiver (300).

$V_p$ comprises the P-wave velocity of the medium.

$V_s$ comprises the S-wave velocity of the medium.

$t_r$ comprises receiver depth in time.

$t_{0ps}$ comprises the travel time of a P-wave from a point (710) above the common reflection point (150) to the common reflection point (150) and the travel time of an S-wave from the common reflection point (150) to the point above the common reflection point (710).

γ comprises ratio of the P-wave velocity and the S-wave velocity.

G comprises the ratio of the S-wave velocity and the P-wave velocity.

In various alternate embodiments these geometrical relationships are known a priori, or determined by reading the trace header, measuring the distances, calculating the distances, measuring the time, or any other method that will occur to those of ordinary skill.

In an even further embodiment, the binning further comprises common reflection point (150) binning (310) for S-P waves. S-P waves are also converted waves. Here a shear wave converts to a compressional wave upon reflection. The geometry of this situation corresponds to the following equations:

$X = X_s + X_r$ $X_r = X - X_s$ $$X_s = \frac{\sqrt{1+(X_s/Z)^2(1-\gamma^2)}}{(1-Z_r/Z)\gamma + \sqrt{1+(X_s/Z)^2(1-\gamma^2)}} X$$

$G = V_s/V_p = 1/\gamma$

X comprises the horizontal offset between the source (100) and receiver (300).

$X_s$ comprises the distance along the horizontal offset from a point (710) above the common reflection point (150) to the source (100).

$X_r$ comprises the distance along the horizontal offset from a point (710) above the common reflection point (150) to the receiver (300).

$Z_r$ comprises the depth of the receiver (300).

Z comprises the depth of the common reflection point (150).

$V_p$ comprises the P-wave velocity of the medium.

$V_s$ comprises the S-wave velocity of the medium.

γ comprises ratio of the P-wave velocity and the S-wave velocity.

G comprises the ratio of the S-wave velocity and the P-wave velocity.

In various alternate embodiments these geometrical relationships are known a priori, or determined by reading the trace header, measuring the distances, calculating the distances, measuring the time, or any other method that will occur to those of ordinary skill.

In an even further embodiment, this is also expressed in terms of travel time:

$X = X_s + X_r$ $$X_s = \frac{\sqrt{1+\left(\frac{1+\gamma}{V_p t_{0sp}} X_s\right)^2 (1-\gamma^2)}}{(1-t_r/t_{0sp})\gamma + \sqrt{1+\left(\frac{1+\gamma}{V_p t_{0sp}} X_s\right)^2 (1-\gamma^2)}} X$$

$X_r = X - X_s$ $G = V_s/V_p = 1/\gamma$ $$t_{0sp} = \frac{1+\gamma}{V_p}Z$$

$$t_r = \frac{1+\gamma}{V_p}Z_r$$

X comprises the horizontal offset between the source (100) and receiver (300).

$X_s$ comprises the distance along the horizontal offset from a point (710) above the common reflection (150) point to the source (100).

$X_r$ comprises the distance along the horizontal offset from a point (710) above the common reflection point (150) to the receiver (300).

$V_p$ comprises the P-wave velocity of the medium.

$V_s$ comprises the S-wave velocity of the medium.

$t_r$ comprises receiver depth in time.

$t_{0sp}$ comprises the travel time of a S-wave from a point (710) above the common reflection point (150) to the common reflection point (150) and the travel time of an P-wave from the common reflection point (150) to the point (710) above the common reflection point (150).

γ comprises ratio of the P-wave velocity and the S-wave velocity.

G comprises the ratio of the S-wave velocity and the P-wave velocity.

In various alternate embodiments these geometrical relationships are known a priori, or determined by reading the trace header, measuring the distances, calculating the distances, measuring the time, or any other method that will occur to those of ordinary skill.

In an even further embodiment analyzing velocity (320) comprises substituting a trial velocity within a moveout equation. In alternate embodiments, the trial velocity is a number, a function of time or depth, a set of numbers, or any other trial velocity that will occur to those of ordinary skill in the art. As will occur to those of ordinary skill, through trial and error of various velocities and velocity models within a moveout equation the data will "flatten." Often the degree of this flattening is used to determine when an acceptable velocity has been found.

Figure 7:
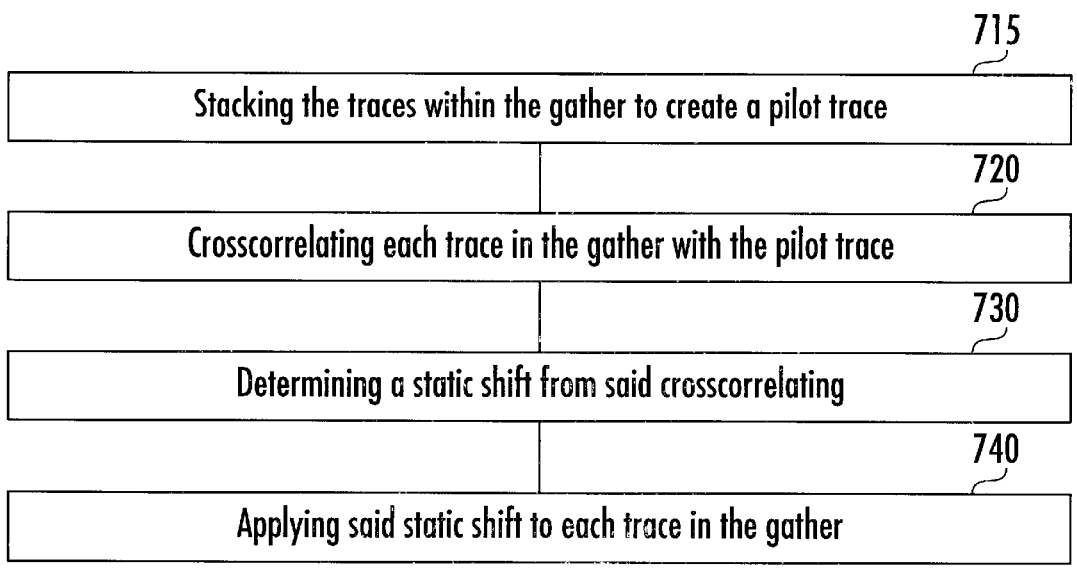
FIG. 7 is a flow diagram of a another aspect of the method of the invention.

Turning now to statics corrections, often the source (100) will be located on the earth (125) in or on what is known as the slow velocity layer. This is a small layer of soft earth, which has a different velocity from the earth below it. Furthermore, many sources (100) on the earth (125) will have slightly different vertical offsets (Z) with the common reflection point (150) because the earth surface is not perfectly flat. In the marine environment, water causes the source (100) to move. As with the earth, the waters bottom (105) is often not perfectly flat and stable. To increase efficiency, this variation in offset must be corrected. Turning now to FIG. 7, in an even further embodiment, the applying surface consistent statics corrections (330) further comprises stacking (715) the traces within the gather to create a pilot trace. The method then comprises crosscorrelating (720) each trace in the gather with the pilot trace. The method then comprises determining (730) a static shift from the crosscorrelating. This static shift is the result of the crosscorrelation. The method then comprises applying (740) the static shift to each trace in the gather.

In alternate embodiments, the applying surface consistent statics corrections (330) comprises applying the static shift corrections to the receiver (300) or the source (100), or both. In an even farther embodiment, the applying surface consistent statics corrections (330) further comprises shifting the source (100) to a source datum (not shown). In an even further embodiment, the applying surface consistent statics corrections (330) further comprises shifting the receiver (300) to a receiver datum (not shown). Of course in alternate embodiments, the source (100) and the receiver (300) are shifted to a common datum (not shown). In some embodiments, the source datum and the receiver datum are essentially the same depth.

In an even further embodiment, the applying a non-hyperbolic normal moveout equation (340) further comprises applying an equation dependent upon the source-receiver geometry. In another embodiment, the normal moveout equation further comprises applying an equation dependent upon the travel time of the seismic wave from the source (100) to the receiver (300).

In one embodiment, the non-hyperbolic normal moveout equation is a P-P wave or S-S wave non-hyperbolic moveout equation. In an even further embodiment, the non-hyperbolic normal moveout equation comprises:

$$t = \sqrt{(t_0/2)^2 + (X_s/V)^2} + \sqrt{(t_0/2 - t_r)^2 + (X_r/V)^2}$$

$$t_0 = 2Z/V$$

$$t_r = Z_r/V$$

t comprises the total travel time from the source (100) to the common reflection point (150) to the receiver (300).

$t_0$ comprises the two way travel time from a point (510) above the common reflection point (150) to the common reflection point (150).

$t_r$ comprises receiver depth in time.

X comprises the horizontal offset between the source (100) and receiver (300).

$X_s$ comprises the distance along the horizontal offset (A) from a point (510) above the common reflection point (150) to the source (100).

$X_r$ comprises the distance along the horizontal offset (X) from a point (510) above the common reflection point (150) to the receiver (300).

$Z_r$ comprises the depth of the receiver (300).

Z comprises the depth of the common reflection point (150).

V comprises the velocity of the medium.

In various alternate embodiments these geometrical relationships are known a priori, or determined by reading the trace header, measuring the distances, calculating the distances, measuring the time, or any other method that will occur to those of ordinary skill.

In an even further embodiment, the non-hyperbolic moveout equation further comprises a P-S wave non-hyperbolic moveout equation. In an even further embodiment, the non-hyperbolic normal moveout equation comprises:

$$t = \frac{1}{1+\gamma}\left[\sqrt{t_{0ps}^2 + \left(\frac{1+\gamma}{V_p}X_s\right)^2} + \gamma\sqrt{(t_{0ps} - t_r)^2 + \left(\frac{1+\gamma}{V_p}X_r\right)^2}\right]$$

$$t_{0ps} = \frac{1+\gamma}{V_p}Z$$

$$t_r = \frac{1+\gamma}{V_p}Z_r$$

$t_{0ps}$ comprises the travel time of a P-wave from a point (710) above the common reflection point (150) to the common reflection point (150) and the travel time of an S-wave from the common reflection point (150) to the point above the common reflection point (150).

t comprises the total travel time from the source (100) to the common reflection point (150) to the receiver (300).

$t_r$ comprises receiver depth in time.

X comprises the horizontal offset between the source (100) and receiver (300).

$X_s$ comprises the distance along the horizontal offset from a point (710) above the common reflection point (150) to the source (100).

$X_r$ comprises the distance along the horizontal offset from a point (710) above the common reflection point (150) to the receiver (300).

$Z_r$ comprises the depth of the receiver (300).

Z comprises the depth of the common reflection point (150).

$V_p$ comprises the P-wave velocity.

γ comprises ratio of the P-wave velocity and the S-wave velocity.

In various alternate embodiments these geometrical relationships are known a priori, or determined by reading the trace header, measuring the distances, calculating the distances, measuring the time, or any other method that will occur to those of ordinary skill.

In a further embodiment a non-hyperbolic moveout equation for S-P waves comprises:

$$t = \frac{1}{1+\gamma}\left[\gamma\sqrt{t_{0sp}^2 + \left(\frac{1+\gamma}{V_p}X_s\right)^2} + \sqrt{(t_{0sp}-t_r)^2 + \left(\frac{1+\gamma}{V_p}X_r\right)^2}\right]$$

$$t_{0sp} = \frac{1+\gamma}{V_p}Z$$

$$t_r = \frac{1+\gamma}{V_p}Z_r$$

X comprises the horizontal offset between the source (100) and receiver (300).

$X_s$ comprises the distance along the horizontal offset from a point (710) above the common reflection point (150) to the source (100).

$X_r$ comprises the distance along the horizontal offset from a point (710) above the common reflection point (150) to the receiver (300).

Z comprises the depth of the common reflection point (150).

$V_p$ comprises the P-wave velocity of the medium.

$t_r$ comprises receiver depth in time.

$t_{0sp}$ comprises the travel time of a S-wave from a point (710) above the common reflection point (150) to the common reflection point (150) and the travel time of an P-wave from the common reflection point (150) to the point (710) above the common reflection point (150).

γ comprises ratio of the P-wave velocity and the S-wave velocity.

G comprises the ratio of the S-wave velocity and the P-wave velocity.

In various alternate embodiments these geometrical relationships are known a priori, or determined by reading the trace header, measuring the distances, calculating the distances, measuring the time, or any other method that will occur to those of ordinary skill.

In an even further embodiment, the stacking (350) further comprises a straight stack, a weighted stack or any other stacking which will occur to those of ordinary skill in the art.

Figure 8:
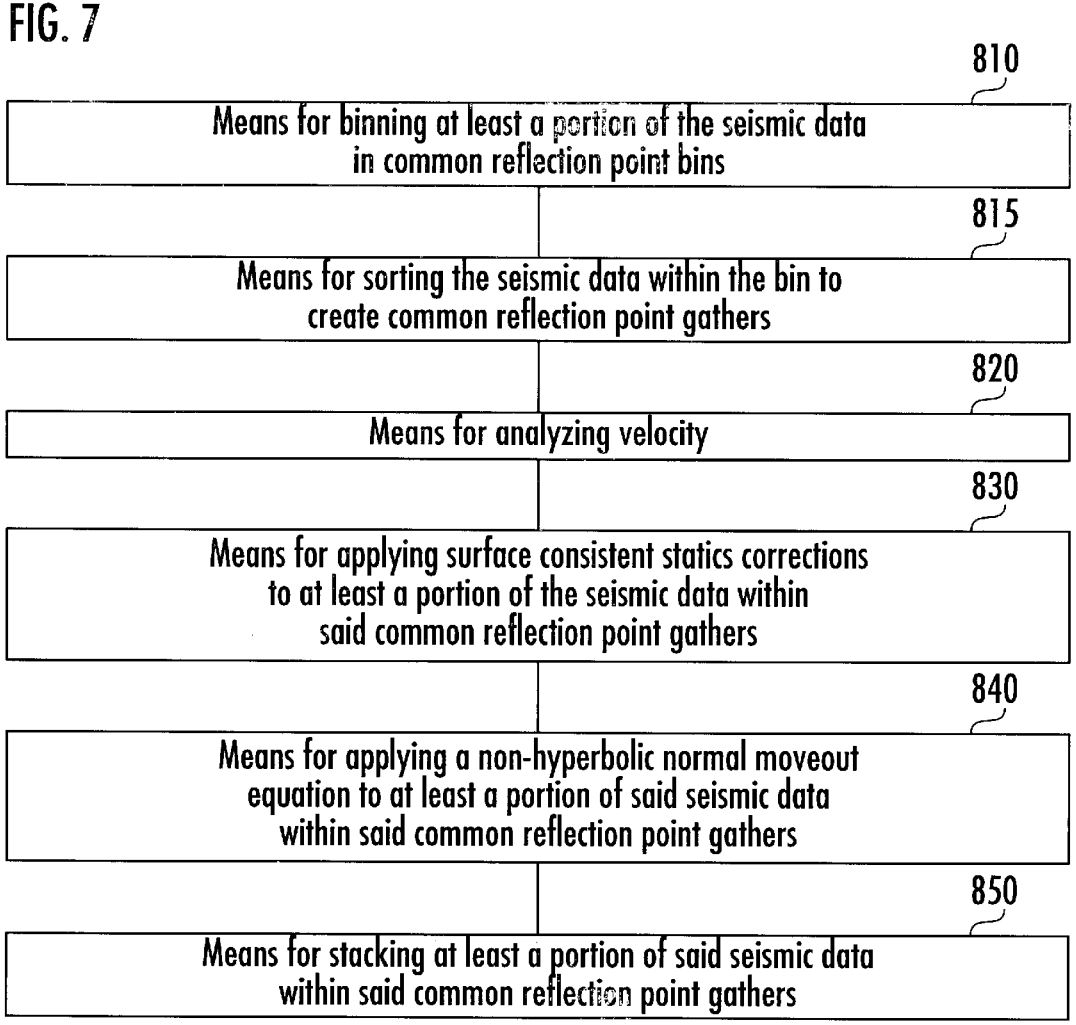
FIG. 8 is a flow diagram of one embodiment of the system of the invention.

In an even further embodiment, a system for processing three-dimensional seismic data is provided. One embodiment of the system of the invention is illustrated in FIG. 8. The system comprises means for binning (810) at least a portion of the seismic data in common reflection point (150) bins. In various embodiments, means for binning (810) is a digital computer or an analog machine capable of binning (310) traces for P-P, S-S, P-S or P-S data having the same common reflection point (150) within gathers. In various alternate embodiments means (810) for binning are digital computers, software running on computers, analog machines, or any other means that will occur to those of ordinary skill in the art.

The system further comprises means (815) for sorting the seismic data within the bin to create common reflection point (150) gathers. In various alternate embodiments, means (810) for binning are digital computers, software running on computers, analog machines, or any other means that will occur to those of ordinary skill in the art.

The system further comprises means (820) for analyzing velocity. In various embodiments, means (820) for analyzing velocity is a digital computer or analog machine capable of iteratively substituting velocities and choosing an acceptable velocity model as will occur to those of ordinary skill in the art. In alternate embodiments, means (820) for analyzing velocity is software running on computers, or any other means that will occur to those of ordinary skill in the art.

The system further comprises means (830) for applying surface consistent statics corrections to at least a portion of the seismic data within the common reflection point gathers. In various embodiments, means (830) for applying surface consistent statics comprises a digital computer, software running on a digital computer, or analog machine that is capable of applying statics corrections to the source (100) or receiver (300) or both.

The system further comprises means (840) for applying a non-hyperbolic normal moveout equation to at least a portion of the seismic data. In various embodiments, means (840) for applying a non-hyperbolic normal moveout equation further comprises a digital computer, software running on a digital computer, or analog machine capable of applying a moveout equation, or any other method that will occur to those of ordinary skill in the art.

The system further comprises means (850) for stacking at least a portion of the seismic data within the common reflection point gathers. In various embodiments means (850) for stacking is a digital computer, software running on a computer, or analog machine capable of stacking traces, or any other means that will occur to those of ordinary skill in the art.

In even further embodiments, the means (810) for binning further comprises means for determining the common reflection point of a trace and means for determining the common reflection point independent of velocity. In various embodiments, means for determining is a digital computer, software running on a computer, or analog machine, or any other means that will occur to those of ordinary skill in the art.

Figure 9:
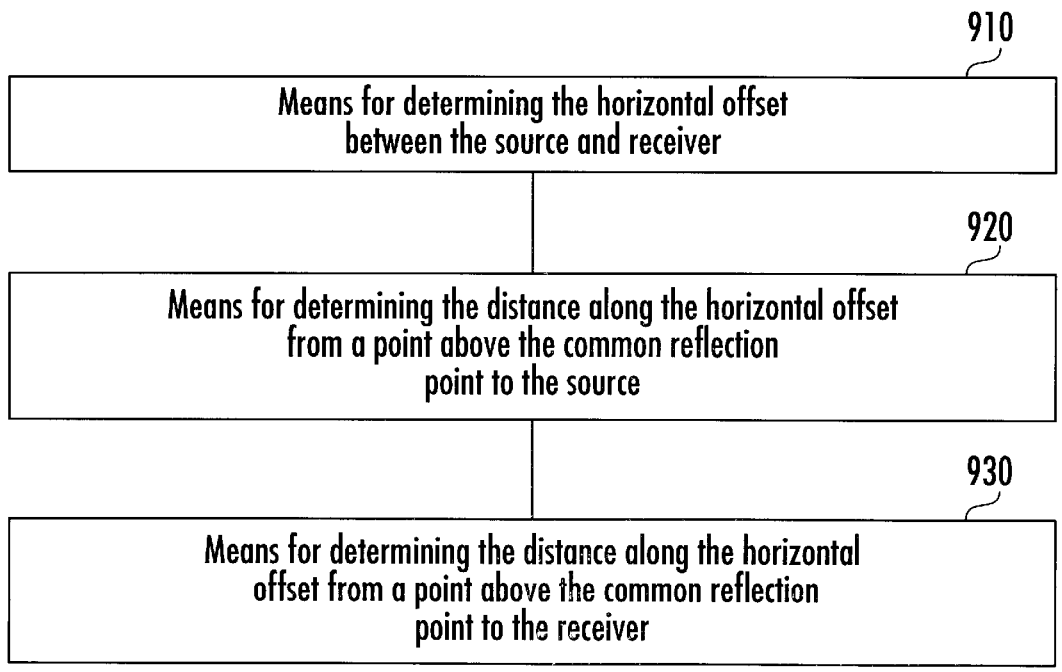
FIG. 9 is a flow diagram of another aspect of a further embodiment of the system of the invention.

Turning now to FIG. 9, in an even further embodiment, the means for determining the common reflection point further comprises means (910) for determining the horizontal offset (X) between the source (100) and receiver (300). The system further comprises means (920) for determining the distance ($X_s$) along the horizontal offset (X) from a point (510)(710) above the common reflection point (150) to the source (100). The system further comprises means (930) for determining the distance ($X_r$) along the horizontal offset (X)

from a point (510)(710) above the common reflection point (150) to the receiver (300). In various alternate embodiments, means (910)(920)(930) for determining is a digital computer or analog machine, ruler, tape measure, trace heading reader, or any other means that will occur to those of ordinary skill in the art. In even further embodiments, means (910)(920)(930) for determining are means for accepting a priori information about the acquisition geometry.

Figure 10:
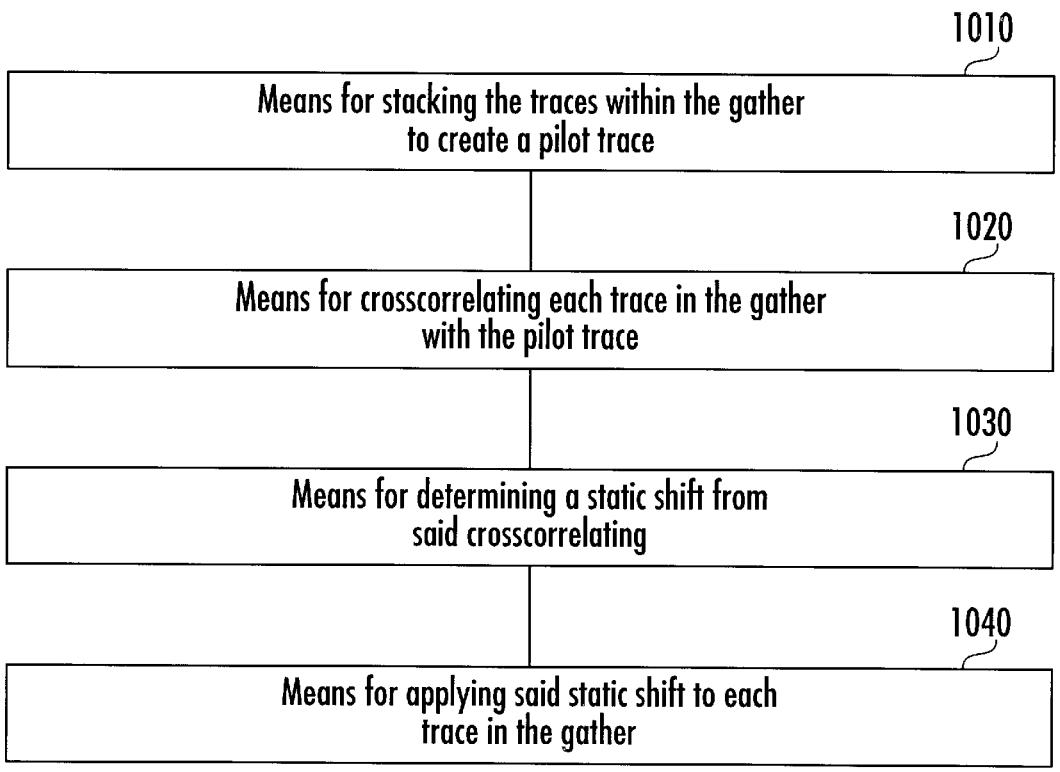
FIG. 10 is a flow diagram of another aspect of a further embodiment of the system of the invention.

Turning now to FIG. 10, in an even further embodiment, the means (830) for applying surface consistent statics corrections further comprises means (1010) for stacking the traces within the gather to create a pilot trace. The system further comprises means (1020) for crosscorrelating each trace in the gather with the pilot trace. The system further comprises means (1030) for determining a static shift from the crosscorrelating. The system further comprises means (1040) for applying the static shift to each trace in the gather. In various alternate embodiments means (1010)(1020)(1030)(1040) is a digital computer, software running on a computer, or analog machine, or any other means that will occur to those of ordinary skill in the art.

Figure 11:
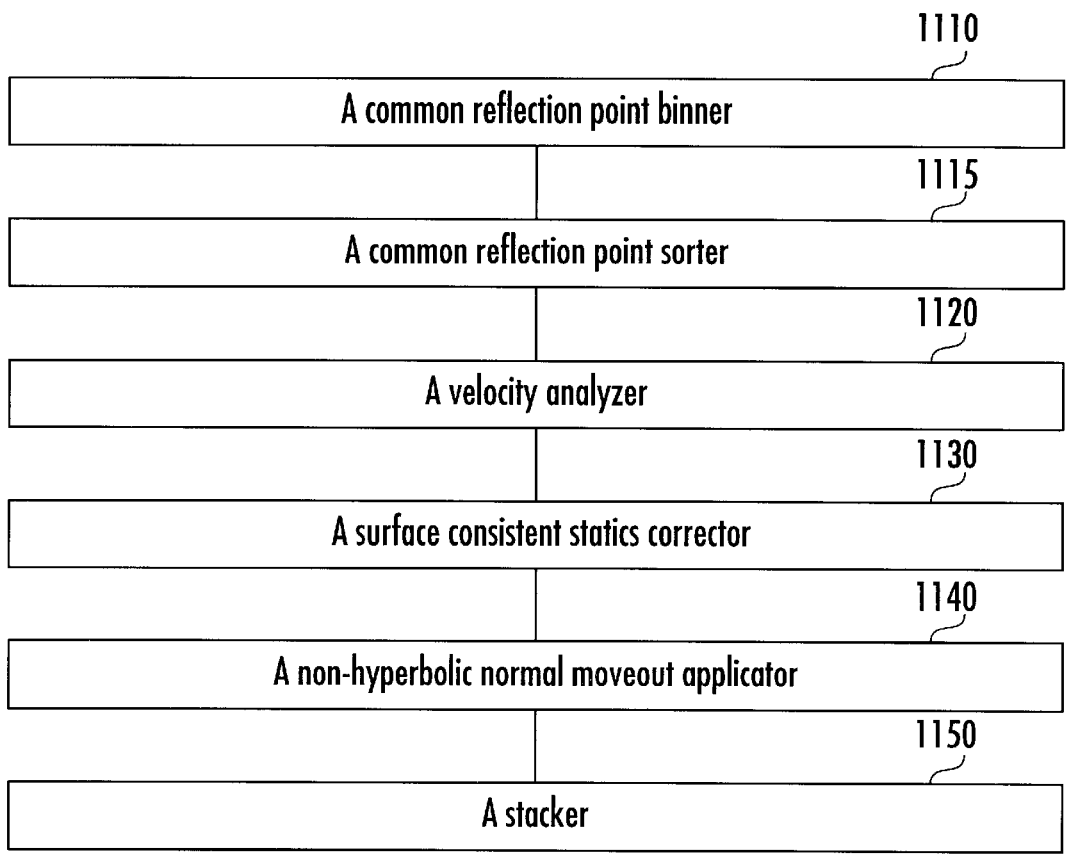
FIG. 11 is a flow diagram of one embodiment of the apparatus of the invention.

In a further embodiment, an apparatus for processing three-dimensional seismic data is provided. As illustrated in FIG. 11, the apparatus comprises a common reflection point binner (1110). In various embodiments, a common reflection point binner (1110) is a digital computer or an analog machine as will occur to those of ordinary skill in the art. The apparatus further comprises a sorter (1115). The apparatus further comprises a velocity analyzer (1120). In various embodiments, a velocity analyzer (1120) is a digital computer or an analog machine as will occur to those of ordinary skill in the art. The apparatus further comprises a surface consistent statics corrector (1130). In various embodiments, a surface consistent static corrector (1130) is a digital computer or an analog machine as will occur to those of ordinary skill in the art. The apparatus further comprises a non-hyperbolic normal moveout applicator (1140). In various embodiments, a non-hyperbolic normal moveout applicator (1140) is a digital computer or an analog machine as will occur to those of ordinary skill in the art. The apparatus further comprises a stacker (1150). In various embodiments, a stacker (1150) is a digital computer or an analog machine as will occur to those of ordinary skill in the art.

Figure 12:
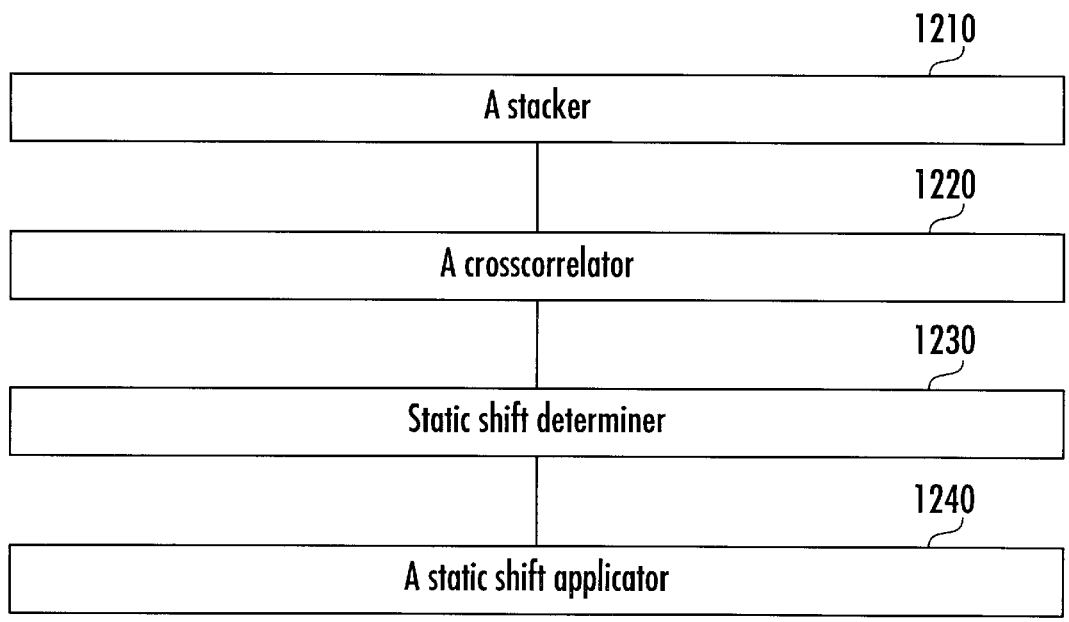
FIG. 12 is a flow diagram of a further embodiment of the apparatus of the invention.

Turning to FIG. 12, in a further embodiment, the surface consistent statics corrections applicator (1130) further comprises a stacker (1210). In various embodiments, a stacker (1210) is a digital computer or an analog machine as will occur to those of ordinary skill in the art. The apparatus further comprises a crosscorrelator (1220). In various embodiments, a crosscorrelator (1220) is a digital computer or an analog machine as will occur to those of ordinary skill in the art. The apparatus further comprises static shift determiner (1210). In various embodiments, a static shift determiner (1210) is a digital computer or an analog machine as will occur to those of ordinary skill in the art. The apparatus further comprises a static shift applicator (1240). In various embodiments, a static shift applicator is a digital computer or an analog machine as will occur to those of ordinary skill in the art.

The above described embodiments of the present invention are given by way of example only and are in no way exhaustive of the scope of the present invention.

We claim:

1. A method for processing three dimensional seismic data, wherein the seismic data is at least partially the result of receiving a seismic wave with a seismic receiver;

wherein at least a portion of the seismic wave is generated by a seismic source;

wherein the source and receiver are horizontally offset and vertically offset, the method comprising:

binning at least a portion of the seismic data in common reflection point bins;

sorting the seismic data within the bin to create common reflection point gathers;

analyzing velocity;

applying surface consistent statics corrections to at least a portion of the seismic data within the common reflection point gathers;

applying a non-hyperbolic normal moveout equation to at least a portion of the seismic data; and stacking at least a portion of the seismic data within the common reflection point gathers.

2. The method of claim 1, wherein the binning further comprises determining the common reflection point of a trace.

3. The method of claim 2, further comprising determining the common reflection point independent of velocity.

4. The method of claim 2, wherein the determining the common reflection point further comprises:

determining the horizontal offset between the source and receiver;

determining the distance along the horizontal offset from a point above the common reflection point to the source; and determining the distance along the horizontal offset from a point above the common reflection point to the receiver.

5. The method of claim 4, wherein:

$$X = X_s + X_r$$

$$X_s = \frac{Z}{2Z - Z_r} X$$

$$X_r = \frac{Z - Z_r}{2Z - Z_r} X$$

wherein X comprises the horizontal offset between the source and receiver;

wherein $X_s$ comprises the distance along the horizontal offset from a point above the common reflection point to the source;

wherein $X_r$ comprises the distance along the horizontal offset from a point above the common reflection point to the receiver;

wherein $Z_r$ comprises the depth of the receiver; and wherein Z comprises the depth of the common reflection point.

6. The method of claim 4, wherein:

$$X = X_s + X_r$$

$$X_s = \frac{1}{2} \frac{t_0}{t_0 - t_r} X$$

$$X_r = \frac{1}{2} \frac{t_0 - 2t_r}{t_0 - t_r} X$$

$$t_0 = 2Z/V$$

$$t_r = Z_r/V$$

wherein $t_0$ comprises the two way travel time from a point above the common reflection point to the common reflection point;

wherein $t_r$ comprises receiver depth in time;

wherein X comprises the horizontal offset between the source and receiver;

wherein $X_s$ comprises the distance along the horizontal offset from a point above the common reflection point to the source;

wherein $X_r$ comprises the distance along the horizontal offset from a point above the common reflection point to the receiver;

wherein $Z_r$ comprises the depth of the receiver; and wherein Z comprises the depth of the common reflection point.

7. The method of claim 4, wherein:

$$X_s = \frac{\sqrt{1+(X_s/Z)^2(1-G^2)}}{(1-Z_r/Z)G+\sqrt{1+(X_s/Z)^2(1-G^2)}}X$$

$X_r = X - X_s$ $X = X_s + X_r$ $G = V_s/V_p = 1/\gamma$ wherein X comprises the horizontal offset between the source and receiver;

wherein $X_s$ comprises the distance along the horizontal offset from a point above the common reflection point to the source;

wherein $X_r$ comprises the distance along the horizontal offset from a point above the common reflection point to the receiver;

wherein $Z_r$ comprises the depth of the receiver;

wherein Z comprises the depth of the common reflection point;

wherein $V_p$ comprises the P-wave velocity of the medium; and wherein $V_s$ comprises the S-wave velocity of the medium.

8. The method of claim 4, wherein:

$$X_s = \frac{\sqrt{1+\left(\frac{1+G}{GV_pt_{0ps}}X_s\right)^2(1-G^2)}}{(1-t_r/t_{0ps})G+\sqrt{1+\left(\frac{1+G}{GV_pt_{0ps}}X_s\right)^2(1-G^2)}}X$$

$X_r = X - X_s$ $X = X_s + X_r$ $G = V_s/V_p = 1/\gamma$ $$t_{0ps} = \frac{1+\gamma}{V_p}Z$$

$$t_r = \frac{1+\gamma}{V_p}Z_r$$

wherein X comprises the horizontal offset between the source and receiver;

wherein $X_s$ comprises the distance along the horizontal offset from a point above the common reflection point to the source;

wherein $X_r$ comprises the distance along the horizontal offset from a point above the common reflection point to the receiver;

wherein $V_p$ comprises the P-wave velocity of the medium;

wherein $V_s$ comprises the S-wave velocity of the medium; and wherein $t_r$ comprises receiver depth in time.

9. The method of claim 4, wherein:

$X = X_s + X_r$ $X_r = X - X_s$ $$X_s = \frac{\sqrt{1+(X_s/Z)^2(1-\gamma^2)}}{(1-Z_r/Z)\gamma+\sqrt{1+(X_s/Z)^2(1-\gamma^2)}}X$$

$G = V_s/V_p = 1/\gamma$ wherein X comprises the horizontal offset between the source and receiver;

wherein $X_s$ comprises the distance along the horizontal offset from a point above the common reflection point to the source;

wherein $X_r$ comprises the distance along the horizontal offset from a point above the common reflection point to the receiver;

wherein $Z_r$ comprises the depth of the receiver;

wherein Z comprises the depth of the common reflection point;

wherein $V_p$ comprises the P-wave velocity of the medium;

wherein $V_s$ comprises the S-wave velocity of the medium;

wherein $\gamma$ comprises ratio of the P-wave velocity and the S-wave velocity; and wherein G comprises the ratio of the S-wave velocity and the P-wave velocity.

10. The method of claim 4, wherein:

$X_r = X - X_s$ $X = X_s + X_r$ $$X_s = \frac{\sqrt{1+\left(\frac{1+\gamma}{V_pt_{0sp}}X_s\right)^2(1-\gamma^2)}}{(1-t_r/t_{0sp})\gamma+\sqrt{1+\left(\frac{1+\gamma}{V_pt_{0sp}}X_s\right)^2(1-\gamma^2)}}X$$

$G = V_s/V_p = 1/\gamma$ $$t_{0sp} = \frac{1+\gamma}{V_p}Z$$

$$t_r = \frac{1+\gamma}{V_p}Z_r$$

wherein X comprises the horizontal offset between the source and receiver;

wherein $X_s$ comprises the distance along the horizontal offset from a point above the common reflection point to the source;

wherein $X_r$ comprises the distance along the horizontal offset from a point above the common reflection point to the receiver;

wherein $V_p$ comprises the P-wave velocity of the medium;

wherein $V_s$ comprises the S-wave velocity of the medium;

wherein $t_r$ comprises receiver depth in time;

wherein $t_{0sp}$ comprises the travel time of a S-wave from a point above the common reflection point to the common reflection point and the travel time of an P-wave from the common reflection point to the point above the common reflection point;

wherein γ comprises ratio of the P-wave velocity and the S-wave velocity; and wherein G comprises the ratio of the S-wave velocity and the P-wave velocity.

11. The method of claim 1, wherein analyzing velocity comprises substituting a trial velocity within a moveout equation.

12. The method of claim 11, wherein the trial velocity is a number.

13. The method of claim 11, wherein the trial velocity is a function.

14. The method of claim 1, wherein the analyzing velocity comprises using a predetermined velocity model.

15. The method of claim 1, wherein the applying surface consistent statics corrections further comprises:

stacking the traces within the gather to create a pilot trace;

crosscorrelating each trace in the gather with the pilot trace;

determining a static shift from the crosscorrelating; and applying the static shift to each trace in the gather.

16. The method of claim 15, wherein the applying surface consistent statics corrections comprises applying the static shift corrections to the receiver.

17. The method of claim 15, wherein the applying surface consistent statics corrections comprises applying the static shift statics corrections to the source.

18. The method of claim 1, wherein the applying surface consistent statics corrections further comprises shifting the source to a source datum.

19. The method of claim 1, wherein the applying surface consistent statics corrections further comprises shifting the receiver to a receiver datum.

20. The method of claim 19, wherein the applying surface consistent statics corrections further comprises shifting the source to a source datum.

21. The method of claim 20, wherein the source datum and the receiver datum are essentially the same depth.

22. The method of claim 1, wherein the applying a non-hyperbolic normal moveout equation further comprises applying an equation dependent upon the source-receiver geometry.

23. The method of claim 1, wherein the applying a non-hyperbolic normal moveout equation further comprises applying an equation dependent upon the travel time.

24. The method of claim 23, wherein the non-hyperbolic normal moveout equation further comprises:

$$t = \sqrt{(t_{0/2})^2 + (X_s/V)^2} + \sqrt{(t_{0/2} - t_r)^2 + (X_r/V)^2}$$

$$t_r = Z_r/V$$

$$t_0 = 2Z/V$$

wherein t comprises the total travel time from the source to the common reflection point to the receiver;

wherein $t_0$ comprises the two way travel time from a point above the common reflection point to the common reflection point;

wherein $t_r$ comprises receiver depth in time;

wherein X comprises the horizontal offset between the source and receiver;

wherein $X_s$ comprises the distance along the horizontal offset from a point above the common reflection point to the source;

wherein $X_r$ comprises the distance along the horizontal offset from a point above the common reflection point to the receiver;

wherein $Z_r$ comprises the depth of the receiver;

wherein Z comprises the depth of the common reflection point; and wherein V comprises the velocity of the medium.

25. The method of claim 23, wherein the non-hyperbolic normal moveout equation further comprises:

$$t = \frac{1}{1+\gamma}\left[\sqrt{t_{0ps}^2 + \left(\frac{1+\gamma}{V_p}X_s\right)^2} + \gamma\sqrt{(t_{0ps} - t_r)^2 + \left(\frac{1+\gamma}{V_p}X_r\right)^2}\right]$$

$$t_{0ps} = \frac{1+\gamma}{V_p}Z$$

$$t_r = \frac{1+\gamma}{V_p}Z_r$$

wherein t comprises the total travel time from the source to the common reflection point to the receiver;

wherein $t_{0ps}$ comprises the travel time of a P-wave from a point above the common reflection point to the common reflection point and the travel time of an S-wave from the common reflection point to the point above the common reflection point;

wherein $t_r$ comprises receiver depth in time;

wherein X comprises the horizontal offset between the source and receiver;

wherein $X_s$ comprises the distance along the horizontal offset from a point above the common reflection point to the source;

wherein $X_r$ comprises the distance along the horizontal offset from a point above the common reflection point to the receiver;

wherein $Z_r$ comprises the depth of the receiver;

wherein Z comprises the depth of the common reflection point;

wherein $V_p$ comprises P-wave velocity; and wherein γ comprises ratio of the P-wave velocity and the S-wave velocity.

26. The method of claim 23, wherein the non-hyperbolic moveout equation further comprises:

$$t = \frac{1}{1+\gamma}\left[\gamma\sqrt{t_{0sp}^2 + \left(\frac{1+\gamma}{V_p}X_s\right)^2} + \sqrt{(t_{0sp} - t_r)^2 + \left(\frac{1+\gamma}{V_p}X_r\right)^2}\right]$$

$$t_{0sp} = \frac{1+\gamma}{V_p}Z$$

$$t_r = \frac{1+\gamma}{V_p}Z_r$$

wherein X comprises the horizontal offset between the source and receiver;

wherein $X_s$ comprises the distance along the horizontal offset from a point above the common reflection point to the source wherein $X_r$ comprises the distance along the horizontal offset from a point above the common reflection point to the receiver;

wherein Z comprises the depth of the common reflection point;

wherein $V_p$ comprises the P-wave velocity of the medium;

wherein $t_r$ comprises receiver depth in time;

wherein $t_{0sp}$ comprises the travel time of a S-wave from a point above the common reflection point to the common reflection point and the travel time of an P-wave from the common reflection point to the point above the common reflection point;

wherein γ comprises ratio of the P-wave velocity and the S-wave velocity; and wherein G comprises the ratio of the S-wave velocity and the P-wave velocity.

27. The method of claim 1, wherein the stacking further comprises a straight stack.

28. The method of claim 1, wherein the stacking further comprises a weighted stack.

29. The method of claim 1, wherein at least one receiver is positioned the ocean bottom.

30. The method of claim 1, wherein at least one receiver is vertically suspended.

31. A system for processing three dimensional seismic data, the system comprising:

means for binning at least a portion of the seismic data in common reflection point bins;

means for sorting the seismic data within the bin to create common reflection point gathers;

means for analyzing velocity;

means for applying surface consistent statics corrections to at least a portion of the seismic data within the common reflection point gathers;

means for applying a non-hyperbolic normal moveout equation to at least a portion of the seismic data; and means for stacking at least a portion of the seismic data within the common reflection point gathers.

32. The system for claim 31, wherein the means for binning further comprises means for determining the common reflection point of a trace.

33. The system for claim 32, further comprising means for determining the common reflection point independent of velocity.

34. The system for claim 32, wherein the means for determining the common reflection point further comprises:

means for determining the horizontal offset between the source and receiver;

means for determining the distance along the horizontal offset from a point above the common reflection point to the source; and means for determining the distance along the horizontal offset from a point above the common reflection point to the receiver.

35. The system for claim 31, wherein means for analyzing velocity comprises means for substituting a trial velocity within a moveout equation.

36. The system for claim 31, wherein the means for applying surface consistent statics corrections further comprises:

means for stacking the traces within the gathers to create a pilot trace;

means for crosscorrelating each trace in the gathers with the pilot trace;

means for determining a static shift from the crosscorrelating; and means for applying the static shift to each trace in the gathers.

37. The system for claim 36, wherein the means for applying surface consistent statics corrections comprises means for applying the static shift corrections to the receiver.

38. The system for claim 36, wherein the means for applying surface consistent statics corrections comprises means for applying the static shift statics corrections to the source.

39. The system for claim 31, wherein the means for applying surface consistent statics corrections further comprises means for shifting the source to a source datum.

40. The system for claim 31, wherein the means for applying surface consistent statics corrections further comprises means for shifting the receiver to a receiver datum.

41. The system for claim 40, wherein the means for applying surface consistent statics corrections further comprises means for shifting the source to a source datum.

42. The system for claim 31, wherein the means for stacking further comprises a means for straight stacking.

43. The system for claim 31, wherein the means for stacking further comprises a means for weighted stacking.

44. An apparatus for processing three dimensional seismic data, the apparatus comprising:

a common reflection point binner;

common reflection point sorter a velocity analyzer;

a surface consistent statics corrector;

a non-hyperbolic normal moveout applicator; and a stacker.

45. The apparatus for claim 44, wherein the common reflection point binner further comprises a common reflection point determiner.

46. The apparatus for claim 45, wherein the common reflection point binner further comprises a P-P wave binner.

47. The apparatus for claim 45, wherein the common reflection point binner further comprises a P-S wave binner.

48. The apparatus for claim 45, wherein the common reflection point binner further comprises an S-S wave binner.

49. The apparatus for claim 45, wherein the common reflection point binner further comprises an S-P wave binner.

50. The apparatus for claim 44, the velocity analyzer comprises a trial velocity substituter.

51. The apparatus for claim 44, wherein the surface consistent statics corrections applicator further comprises:

a stacker;

a crosscorrelator;

static shift determiner; and a static shift applicator.

* * * * *